US008252449B2

(12) United States Patent
Tsukuda et al.

(10) Patent No.: US 8,252,449 B2
(45) Date of Patent: Aug. 28, 2012

(54) SEPARATOR FOR ELECTROCHEMICAL ELEMENT

(75) Inventors: Takahiro Tsukuda, Tokyo (JP); Masatoshi Midorikawa, Tokyo (JP)

(73) Assignee: Mitsubishi Paper Mills Limited, Tokyo (JP)

( * ) Notice: Subject to any disclaimer, the term of this patent is extended or adjusted under 35 U.S.C. 154(b) by 1149 days.

(21) Appl. No.: 11/547,630

(22) PCT Filed: Apr. 15, 2005

(86) PCT No.: PCT/JP2005/007315

§ 371 (c)(1),
(2), (4) Date: Oct. 5, 2006

(87) PCT Pub. No.: WO2005/101432

PCT Pub. Date: Oct. 27, 2005

(65) Prior Publication Data

US 2007/0287062 A1 Dec. 13, 2007

(30) Foreign Application Priority Data

Apr. 16, 2004 (JP) ................................ 2004-121440

(51) Int. Cl.
*H01M 2/14* (2006.01)

(52) U.S. Cl. ...................................................... 429/129

(58) Field of Classification Search ................... 429/129
See application file for complete search history.

(56) References Cited

U.S. PATENT DOCUMENTS 6,642,282 B2 * 11/2003 Shinohara et al. .............. 521/53
6,703,497 B1 * 3/2004 Ladouce et al. ................ 536/56
2003/0180622 A1 * 9/2003 Tsukuda et al. .............. 429/249

FOREIGN PATENT DOCUMENTS

JP 2002-355505 A 12/2002
JP 2003-168629 A 6/2003
JP 2004-079668 A 3/2004

OTHER PUBLICATIONS

European Supplementary Search Report dated Aug. 31, 2010 for corresponding European Application No. 05730630.0.

* cited by examiner

*Primary Examiner* — Melvin C Mayes
*Assistant Examiner* — Bijay Saha
(74) *Attorney, Agent, or Firm* — Birch, Stewart, Kolasch & Birch, LLP

(57) ABSTRACT

The present invention discloses a separator for an electrochemical element which comprises wet nonwoven fabric containing fibrillated cellulose, non-fibrillated fiber, and fibrillated heat-resistant fiber having all of a softening point, a melting point and a thermal decomposition temperature of 250° C. or higher and 700° C. or lower, and dimensional change rates of MD and CD subjected the wet nonwoven fabric to heat treatment at 250° C. for 50 hours of each −3% to +1%.

6 Claims, No Drawings

SEPARATOR FOR ELECTROCHEMICAL ELEMENT

TECHNICAL FIELD

The present invention relates to a separator for an electrochemical element which has excellent heat-resistance and can realize an electrochemical element with low resistance or an electrochemical element with high reliability.

BACKGROUND ART

In an electric double layer capacitor using an organic solvent type electrolyte, lowering in withstand voltage or voltage maintaining rate, etc. occurs even when a minute amount of water is migrated therein to cause bad influences on capacitor characteristics, so that it has generally been carried out to remove the water component contained these members by drying them at a high temperature for a long period of time in a state that electrodes and a separator are wound or laminated together. Therefore, it has been required for the separator to have heat resistance which can endure a high temperature atmosphere for a long period of time. In the preparation steps of an aluminum solid electrolytic capacitor using a conductive polymer as a dielectric material, there is a so-called re-conversion treatment in which an aluminum foil subjected to conversion treatment and a separator are wound or laminated together and it is subjected to a high temperature heat treatment in such a state, so that the separator is required to have heat-resistance. Moreover, after the re-conversion treatment, there is a step of impregnating a monomer solution of a conductive polymer and polymerizing the same, so that the separator is required to have a monomer solution permeability of the conductive polymer after the high temperature heat treatment. There may be mentioned, for example, a separator for an electric double layer capacitor comprising a fiber sheet which contains fiber having fibril and fine polyester fiber with a fineness of 0.45 dtex or less (for example, see Patent Literature 1), an electrolytic capacitor comprising a separator which comprises polyamide fiber as a main fiber (for example, see Patent Literature 2), etc.

However, there is a problem that these separators are dried at a temperature higher than a softening temperature of the fiber constituting the separator for a long period of time, they do not work as a separator due to softening or heat deterioration of the fiber, or a problem that formation of a conductive polymer film becomes difficult since permeability of a monomer solution for the conductive polymer is lost.

[Patent Literature 1] Japanese Unexamined Patent Publication No. 2001-244150

[Patent Literature 2] Japanese Unexamined Patent Publication No. 2002-198263

DISCLOSURE OF THE INVENTION

Problems to be Solved by the Invention

An object of the present invention is to provide a separator for an electrochemical element which realizes an electrochemical element having excellent heat-resistance and low resistance or an electrochemical element having high reliability.

Means to Solve the Problems

The present inventors have carried out extensive studies to solve the problems, and as a result, they have found that by using fibrillated heat-resistant fiber, fibrillated cellulose and non-fibrillated fiber as essential components, and designing and producing the physical properties after heat treatment within a suitable range, an electrochemical element having excellent in heat-resistance or low resistance or a separator for an electrochemical element which realizes an electrochemical element with high reliability can be obtained, whereby they have accomplished the present invention.

That is, the present invention relates to a separator for an electrochemical element which comprises wet nonwoven fabric containing fibrillated cellulose, non-fibrillated fiber, and fibrillated heat-resistant fiber having all of a softening point, a melting point and a thermal decomposition temperature of 250° C. or higher and 700° C. or lower, and dimensional change rates of MD (machine direction) and CD (a direction which is right angle to the MD) subjected the wet nonwoven fabric to heat treatment at 250° C. for 50 hours of each −3% to +1%.

In the present invention, the fibrillated heat-resistant fiber is preferably a wholly aromatic polyamide fiber.

In the present invention, the fibrillated heat-resistant fiber is preferably a wholly aromatic polyester fiber.

In the present invention, the fibrillated cellulose is preferably cellulose obtained from parenchyma cells of a plant.

The above-mentioned separator for an electrochemical element according to the present invention is preferably a separator for an electric double layer capacitor having a density subjected the above-mentioned wet nonwoven fabric to heat treatment at 250° C. for 50 hours of 0.25 g/cm$^3$ or more and 0.55 g/cm$^3$ or less, a maximum pore size of 3.5 μm or less, and an air permeability at a pressure of 0.1 bar of 0.3 L/min/cm$^2$ or more and less than 3 L/min/cm$^2$.

The above-mentioned separator for an electrochemical element according to the present invention is preferably a separator for a solid electrolytic capacitor having, after subjecting the above-mentioned wet nonwoven fabric to heat treatment at 280° C. for 60 minutes, a longer diameter of a wet region which is formed by a water drop dropped according to the dropping method of JIS L1907 and permeated to a plane direction after 60 seconds of 20 mm or more.

BEST MODE TO CARRY OUT THE INVENTION

The electrochemical element in the present invention means a manganese dry battery, an alkaline manganese battery, a silver oxide battery, a lithium battery, a lead storage battery, a nickel-cadmium storage battery, a nickel-hydrogen storage battery, a nickel-zinc storage battery, a silver oxide-zinc storage battery, a lithium ion battery, a lithium polymer battery, various kinds of gel electrolyte batteries, a zinc-air storage battery, an iron-air storage battery, an aluminum-air storage battery, a fuel battery, a solar battery, a sodium sulfur battery, a polyacene battery, an electrolytic capacitor, an electric double layer capacitor, etc. As an electrode for the electric double layer capacitor, it may be a combination of either a pair of electric double layer type electrodes, one is an electric double layer type electrode and the other is an oxidation-reduction type electrode, or a pair of oxidation-reduction type electrodes. As the electric double layer type electrodes of an electric double layer capacitor, there may be mentioned, for example, carbonaceous materials such as activated carbon, activated carbon fiber, carbon nanotube, non-porous carbon, etc., and as the oxidation-reduction type electrodes, there may be mentioned, for example, metal oxides such as ruthenium oxide, indium oxide, tungsten oxide, etc., and conductive polymers such as polypyrrole, polythiophene, polyaniline, polyacetylene, polyacene, derivatives thereof, etc. For the electrolyte, there may be mentioned an aqueous solution in which an ion dissociative salt is dissolved, those in which an ion dissociative salt is dissolved in an organic solvent such as propylene carbonate (PC), ethylene carbonate (EC), dimethyl carbonate (DMC), diethyl carbonate (DEC), acetonitrile (AN), γ-butyrolactone (BL), dimethylformamide (DMF), tetrahydrofuran (THF), dimethoxyethane (DME), dimethoxymethane (DMM), sulfolane (SL), dimethylsulfoxide (DMSO), ethylene glycol, propylene glycol, etc., ionic liquid (solid fused salt), etc., but the invention is not limited by these. In the case of an electrochemical element which can utilize both of an aqueous solution series and an organic solvent series one, the organic solvent series one is preferred since the aqueous solution series has a low electric strength. In a lithium ion battery, a lithium polymer battery, an electric double layer capacitor, an electrolytic capacitor, etc., a conductive polymer film such as polypyrrole, polythiophene, polyaniline, polyacetylene, polyacene, derivatives thereof, etc., may be used in place of an electrolyte.

In the present invention, as the heat-resistant fiber having all of a softening point, a melting point and a thermal decomposition temperature of 250° C. or higher and 700° C. or lower (in the following, it may be sometimes simply referred to as "heat-resistant fiber".), there may be mentioned wholly aromatic polyamide, wholly aromatic polyester, wholly aromatic polyester amide, wholly aromatic polyether, wholly aromatic polycarbonate, wholly aromatic polyazomethine, polyphenylene sulfide (PPS), poly-p-phenylenebenzobisthiazole (PBZT), polybenzimidazole (PBI), polyetherether ketone (PEEK), polyamideimide (PAI), polyimide, polytetrafluoroethylene (PTFE), poly-p-phenylene-2,6-benzobisoxazole) (PBO), etc., they may be used alone, or in combination of two or more kinds. PBZT may be either a trans type or a cis type. Here, in the category of "all of a softening point, a melting point and a thermal decomposition temperature being 250° C. or higher and 700° C. or lower", those having a thermal decomposition temperature is 250° C. or higher and 700° C. or lower whereas a softening point and a melting point are not clear are also contained. Wholly aromatic polyamide or PBO, etc., is an example thereof. Of these fibers, wholly aromatic polyamide which is easily and uniformly fibrillated due to its liquid crystallinity, in particular, para series wholly aromatic polyamide and wholly aromatic polyester are preferred.

A softening point, a melting point and a thermal decomposition temperature of the heat-resistant fiber to be used in the present invention are either preferably 260° C. to 650° C., more preferably 270° C. to 600° C., most preferably 280° C. to 550° C.

The para series wholly aromatic polyamide may be mentioned poly(paraphenylenetelephthalamide), poly(parabenzamide), poly(paraamide hydrazide), poly(paraphenylenetelephthalamide-3,4-diphenyl ether telephthalamide), poly(4,4'-benzanilide telephthalamide), poly(paraphenylene-4,4'-biphenylenedicarboxylic acid amide), poly(paraphenylene-2,6-naphthalene dicarboxylic acid amide), poly(2-chloro-p-phenylenetelephthalamide), copolyparaphenylene-3,4'-oxydiphenylenetelephthalamide, etc., but the invention is not limited by these.

The wholly aromatic polyester can be synthesized by combining monomers such as an aromatic diol, an aromatic dicarboxylic acid, an aromatic hydroxycarboxylic acid, etc., and changing a compositional ratio. For example, there may be mentioned a copolymer of p-hydroxybenzoic acid and 2-hydroxy-6-naphthoic acid, but the invention is not limited by these.

The fibril in the present invention represents a fiber which is fiber state having an extremely fine portion by divided to the direction mainly parallel to the fiber axis and at least a part thereof is a fiber diameter of 1 μm or less, and is different from fibrid as clearly described in U.S. Pat. No. 5,833,807 or U.S. Pat. No. 5,026,456 in a preparation method and a shape. The fibrid can be obtained by solidifying and precipitating an Aramid polymer solution in a precipitating agent under high speed stirring, and in U.S. Pat. No. 5,026,456, an aspect ratio which is a ratio of a length and a width is described to be 5:1 to 10:1. The fibril in the present invention is preferably distributed with an aspect ratio which is a ratio of a length and a width in the range of 20:1 to 100000:1, and a Canadian Standard Freeness is preferably within the range of 0 ml to 500 ml. Moreover, those having a weight average fiber length of in the range of 0.1 mm or longer and 2 mm or shorter and having a specific surface area of in the range of 1 to 20 $m^2/g$ are preferred. The weight average fiber length can be obtained by using a commercially available fiber length measurement apparatus which utilizes polarization characteristics obtained by irradiating laser beam to the fiber. The specific surface area can be obtained by measuring according to the BET one-point method. Provided that in the case of fibrillated cellulose, it becomes a film state when it is dried, and there is a case where measurement by the BET one-point method is difficult.

The fibrillated cellulose in the present invention means bacteria cellulose or mechanically fibrillated cellulose. The former means bacteria cellulose produced by microorganisms. This bacteria cellulose is those which contain cellulose and hetero-polysaccharide comprising cellulose as a main chain and those which contain glucane such as β-1,3, β-1,2, etc. A constitutional component(s) in the case of the hetero-polysaccharide other than cellulose is/are hexose, pentose and organic acid such as mannose, fructose, galactose, xylose, Arabinose, rhamnose, glucuronic acid, etc. These polysaccharides are constituted by a single substance in some cases, and there are cases where two or more kinds of polysaccharides bind by hydrogen bond, etc., and both of them can be utilized.

The latter means those using various kinds of pulp including linter, lint, regenerated cellulose, solvent spinning cellulose, fiber obtained from parenchyma cells of a plant, etc. as a starting material, and fibrillated in the same manner as in the above-mentioned fibrillated heat-resistant fiber. When the fibrillated cellulose is used alone, it is carbonized and decomposed by heat treatment so that it does not work as a separator. However; when it is mixed with fibrillated heat-resistant fiber as in the present invention, it entwines with fibrillated heat-resistant fiber, or it forms a firm network structure between the fibrillated cellulose itself and other fibers by a hydrogen bond and an area exposed to the surface becomes small by the fibrillated heat-resistant fiber existing around thereof, so that it does not completely subject to carbonization and decomposition even when heat treatment is carried out under severe conditions which cannot usually be endured, and functions as a separator can be shown. This is clear from the difference in appearances of the fibrillated cellulose alone and a mixed material of the fibrillated cellulose and the fibrillated heat-resistant fiber after subjecting them to heat treatment at 200° C. or higher. That is, if the fibrillated cellulose is used alone, carbonization and decomposition occur so that the material cannot maintain the original shape by being burnt and becomes hard, but in a mixed material, carbonization and decomposition are controlled whereby the original shape and suppleness can be maintained.

As effects shown by the fibrillated cellulose after the heat treatment, there are mentioned that a suitable air permeability or pore size can be maintained by strong tensile strength and pierce strength, and by large specific surface area due to firm network structure of the fibrillated cellulose. Among the fibrillated celluloses, natural celluloses such as linter or fiber obtained from parenchyma cells have high uniformity, and easily become extremely fine fibril, so that a thickness or pore size of a separator for an electrochemical element tends to be uniform, whereby a controlling power of an air permeability or pore size is large. In the fibrillated cellulose obtained from regenerated cellulose or solvent spinning cellulose, the fibril difficulty becomes fine as compared with that of the natural cellulose, and a controlling power of an air permeability or pore size of a separator for an electrochemical element is inferior, and effects of strengthening tensile strength or pierce strength are small.

The fiber obtained from parenchyma cells in the present invention is fiber insoluble in water and mainly comprising cellulose obtained by, for example, treating portions mainly comprising parenchyma cells existing in stem or leaves of a plant, fruits, etc. with an alkali, and the like. The parenchyma cells have a characteristic that its secondary wall is not developed.

In the present invention, to obtain fiber from parenchyma cells, inner parenchyma tissues of a stem, mesophyll of leaves, fruits, etc. are pulverized, and it is industrially optimum to use squeezed waste of a juice from fruits, squeezed waste of sugarcane, sugar beet, etc., exhausted from food processing factories, sugar manufacturing factories, etc. of these, when squeezed waste of sugarcane is utilized, it is effective to obtain waste containing much amount of parenchyma cells by previously separating portions containing much amount of parenchyma cells from the stems of sugarcane by using, for example, a cane separator manufactured by Amcane International, and subjecting to squeezing a juice, whereby waste containing much amount of parenchyma cells can be obtained. Also, when squeezed waste of sugar beet is utilized, crushed roots are squeezed to obtain a juice and the remaining waste can be utilized as such.

In the present invention, to obtain fiber from parenchyma cells, there may be employed a craft pulp method or a soda pulp method, for example, in which squeezed waste, etc., is mixed with an alkali such as caustic soda, etc., and heating the same to decompose and remove lignin. Detailed pulping treatment conditions may be optionally determined by referring to characteristics of starting materials or characteristics, yield, etc., of the objective fiber, etc. Then, the alkali is removed by washing, and then, bleaching treatment is carried out, if necessary. As a bleaching agent, hydrogen peroxide, chlorine dioxide, sodium hypochlorite, oxygen, ozone, etc., can be used. After bleaching, the material was washed to obtain a suspension of fiber.

As the fibrillated heat-resistant fiber and the fibrillated cellulose in the present invention, there may be used a refiner, a beater, a mill, a pulverizer, a rotary blade system homogenizer in which a shear force is provided by a high-speed rotating blade, a double-cylinder type high speed homogenizer in which a shear force is generated between an inner blade which is a cylinder shape and rotating with a high-speed and a fixed outer blade, a ultrasonic wave crusher in which a material is fined by an impact of ultrasonic wave, a high-pressure homogenizer in which at least 3000 psi pressure difference is provided to a fiber suspension to pass through a small diameter orifice to provide a high-speed, and by colliding them to cause rapid deceleration whereby a shear force or a cutting force is provided to the fiber, and the like, in particular, those prepared by a high-pressure homogenizer are preferred since finer fibril can be obtained.

As the non-fibrillated fiber to be used in the present invention, there may be mentioned single fiber or complex fiber comprising a polyester such as polyethylene terephthalate, polyethylene isophthalate, a derivative thereof, etc., polyolefin, acryl, polyamide, polyether sulfone (PES), polyvinylidene fluoride (PVDF), polyvinyl alcohol, ethylene-vinyl alcohol copolymer, ethylene-vinyl acetate copolymer, natural fiber, regenerated cellulose, solvent spinning cellulose (lyocell), etc., heat-resistant fiber having all of a softening point, a melting point and a thermal decomposition temperature of 250° C. or higher and 700° C. or lower.

A fiber length of these non-fibrillated fibers is preferably 0.1 mm to 15 mm, more preferably 1 mm to 10 mm. If the fiber length is shorter than 0.1 mm, the fiber is easily dropped, while if it is longer than 15 mm, the fiber gets entangled to easily cause mass, and unevenness in thickness likely caused in some cases. An average fiber diameter of these non-fibrillated fibers is preferably 0.0002 μm or more and 30 μm or less, more preferably 0.01 μm or more and 20 μm or less. A fineness is preferably 0.0001 dtex or more and 3 dtex or less, more preferably 0.005 dtex or more and 2 dtex or less. If the average fiber diameter is less than 0.01 μm, in particular if it is less than 0.0002 μm, or if the fineness is less than 0.005 dtex, in particular if it is less than 0.0001 dtex, the fiber is too fine so that it is difficult to capture the fibrillated heat-resistant fiber and the fibrillated cellulose, whereby a basic skeleton of the wet nonwoven fabric is difficulty formed in some cases. If the average fiber diameter is thicker than 20 μm, in particular if it is thicker than 30 μm, or if the fineness is thicker than 2 dtex, in particular if it is thicker than 3 dtex, the fibrillated heat-resistant fiber and the fibrillated cellulose easily dropped, and as a result, pin holes are likely generated, and texture formation becomes uneven in some cases.

A sectional shape of the non-fibrillated fiber to be used in the present invention may be either of circular, ellipse shape, square, rectangular, star shape, Y shape, or any other different shapes.

The fibrillated heat-resistant fiber, the fibrillated cellulose and the non-fibrillated fiber which constitute the wet nonwoven fabric to be used in the present invention are preferably formulated, for example, in amounts of 15% by weight to 80% by weight of the fibrillated heat-resistant fiber, 5% by weight to 35% by weight of the fibrillated cellulose and 10% by weight to 75% by weight of the non-fibrillated fiber, more preferably 20% by weight to 70% by weight of the fibrillated heat-resistant fiber, 5% by weight to 30% by weight of the fibrillated cellulose and 15% by weight to 70% by weight of the non-fibrillated fiber, most preferably 25% by weight to 60% by weight of the fibrillated heat-resistant fiber, 10% by weight to 20% by weight of the fibrillated cellulose and 20% by weight to 65% by weight of the non-fibrillated fiber.

The separator for an electrochemical element of the present invention has dimensional change rates of both of MD (machine direction) and CD (a direction which is right angle to the MD) when the wet nonwoven fabric is subjected to heat treatment at 250° C. for 50 hours of −3% to +1%. When it is subjected to heat treatment at a lower temperature than 250° C., they are within the range of −3% to +1%. When the dimensional change rate is lower than −3% to the minus side, it means that shrinkage of the separator for an electrochemical element is remarkable, and surface smoothness is markedly impaired. Therefore, adhesiveness with electrode(s) becomes worse, and an internal resistance of the electrochemical element tends to be high. Also, when a monomer solution of the conductive polymer is impregnated to form a conductive polymer film, the conductive polymer film tends to be formed ununiformly and the internal resistance tends to be high. In particular, when the separator for an electrochemical element comprises a material mixing an organic fiber and an inorganic fiber, the surface after the heat treatment becomes rough because of a big difference between a linear expansion coefficient of an organic fiber and that of an inorganic fiber at the time of heating, whereby the surface smoothness becomes likely markedly-bad. Also, when an electrode and a separator for an electrochemical element are wound to form an element and the whole element is subjected to heat treatment, shrinkage of the separator for an electrochemical element is too large whereby the element likely falls apart. Similarly, when the dimensional change rate is larger than +1%, then the element likely falls apart. To put the dimensional change rate of the wet nonwoven fabric in the range of −3% to +1%, it can be accomplished by a method in which, for example, (1) when a formulation amount of the fibrillated heat-resistant fiber is 40% by weight or more, then a formulation amount of the non-fibrillated fiber having a component a melting point of which is lower than 200° C. is made 0% by weight to 30% by weight, (2) when the formulation amount of the fibrillated heat-resistant fiber is 15% by weight or more and less than 40% by weight, then the formulation amount of the non-fibrillated fiber having a component a melting point of which is lower than 200° C. is made 0% by weight to 20% by weight, and a formulation amount of the non-fibrillated heat-resistant fiber is made 10% by weight or more, and the like. Here, "the non-fibrillated fiber having a component a melting point of which is lower than 200° C." means, in single fiber or complex fiber, non-fibrillated fiber having a resin component a melting point of which is lower than 200° C. as a part thereof. In the complex fiber, it is preferred that part of the resin component a melting point of which is lower than 200° C. is exposed at the fiber surface portion.

As a device which heats to 250° C. to be used for the heat treatment, a commercially available isothermal drier or an electric oven, etc., may be used. An atmosphere may be either air, an inert gas or vacuum, and in an actual preparation of an electrochemical element, the heat treatment is often carried out in either an inert gas or under vacuum to restrain lowering in strength of the separator for an electrochemical element due to deterioration by oxidation or remarkable change in physical properties of the same. When the atmosphere is made vacuum, it may be a vacuum degree of higher than $10^{-2}$ Torr. In the present invention, it means that those having physical properties after the heat treatment in air at 250° C. for 50 hours, which are outside the preferred range, can obtain only insufficient characteristics as a separator for an electrochemical element even when it is subjected to heat treatment in vacuum.

In the separator for an electrochemical element of the present invention, when it has characteristics of a density after subjecting the above-mentioned wet nonwoven fabric to heat treatment at 250° C. for 50 hours of 0.25 g/cm$^3$ or more and 0.55 g/cm$^3$ or less, the maximum pore size of 3.5 μm or less, and, an air permeability at a pressure of 0.1 bar of 0.3 L/min/cm$^2$ or more and less than 3 L/min/cm$^2$, it can be used as a separator for electric double layer capacitor. In the present invention, it is preferred to adjust the material to a desired density by a calendar treatment before the heat treatment, if necessary. When the density after the heat treatment at 250° C. for 50 hours of less than 0.25 g/cm$^3$, strength of the separator for an electrochemical element becomes sometimes insufficient, while if it is higher than 0.55 g/cm$^3$, electrolyte maintaining property becomes insufficient, and an internal resistance of the electrochemical element becomes sometimes high. When the maximum pore size is larger than 3.5 μm, an electrode active substance with a small particle size passes without dropping in whereby internal short circuit sometimes occurs. Accordingly, the maximum pore size is preferably 3.5 μm or less, and not to prevent from ion permeability, it is more preferably 0.1 μm or more. If the air permeability is less than 0.3 L/min/cm$^2$, ion permeability becomes poor, and an internal resistance of the electrochemical element tends to be high. On the other hand, if it is 3 L/min/cm$^2$ or more, a number of fiber in the separator for an electrochemical element becomes too little whereby self-discharge between electrodes or internal short circuit likely occur, and a voltage maintaining rate is lowered or leak current becomes large in some cases. To make the air permeability of the wet nonwoven fabric 0.3 L/min/cm$^2$ or more and less than 3 L/min/cm$^2$, it can be accomplished by adjusting the relations between the following 8 factors, i.e., (1) a fibrillation degree of the fibrillated heat-resistant fiber (a weight average fiber length, an aspect ratio, freeness, a specific surface area), (2) a formulation amount of the fibrillated heat-resistant fiber, (3) a size of non-fibrillated fiber, (4) a formulation amount of the non-fibrillated fiber, (5) a fibrillation degree of the fibrillated cellulose (a weight average fiber length, an aspect ratio, freeness, a specific surface area), (6) a formulation amount of the fibrillated cellulose, (7) a basis weight of the wet nonwoven fabric, and (8) a density of the wet nonwoven fabric.

In the separator for an electrochemical element of the present invention, when it has a property that the above-mentioned wet nonwoven fabric is subjected to heat treatment at 280° C. for 60 minutes, and a longer diameter of a wet region formed by a water drop dropped onto the above fabric by the dropping method according to JIS L1907 permeated to a plane surface direction after 60 seconds being 20 mm or longer, it can be used as a separator for a solid electrolytic capacitor. Of course, when it is subjected to heat treatment at a low temperature than 280° C., it shows a longer diameter of 20 mm or longer. The water drop is dropped only one drop from a burette fixed at the height of 10 mm from the surface of the separator for an electrochemical element. The longer diameter of the wet region in the present invention means a longer diameter of a wet region formed in a pseudocircular shape with the water drop as a center by permeating the water drop into the separator for an electrochemical element. In the present invention, a longer diameter of a wet region after 60 seconds from dropping the water drop is used as an index. By using this method, evaluation can be carried out with good reproducibility. When the longer diameter of a wet region after 60 seconds in the present invention is less than 20 mm, permeability of a monomer solution of the conductive polymer is poor whereby formation of a conductive polymer film is difficult.

To make the longer diameter of a wet region after 60 seconds in the present invention 20 mm or longer, an amount of the fiber which becomes hydrophobic by subjecting to heat treatment at 280° C. for 60 minutes is made as little as possible or such a fiber is not added. As a fiber which becomes hydrophobic by subjecting to heat treatment at 280° C. for 60 minutes, there may be mentioned polyethylene terephthalate, polyethylene isophthalate, and a polyester fiber comprising these derivatives, etc.

Also, as the separator for a solid electrolytic capacitor of the present invention, preferred are those having a density after heat treatment at 250° C. for 50 hours of the above-mentioned wet nonwoven fabric of 0.25 g/cm$^3$ or more and 0.55 g/cm$^3$ or less, an air permeability at a pressure of 0.1 bar of 3 L/min/cm$^2$ or more and less than 30 L/min/cm$^2$. When the air permeability is less than 3 L/min/cm$^2$, an amount of the fiber in the separator for an electrochemical element is too much, so that formation of a conductive polymer film become ununiform, and an internal resistance of the solid electrolytic capacitor becomes sometimes high. On the other hand, when it is 30 L/min/cm$^2$ or more, an amount of the fiber in the separator for an electrochemical element is too little, so that strength of the conductive polymer film becomes sometimes insufficient, and internal short circuit sometimes occurs. To make the air permeability of the wet nonwoven fabric at a pressure of 0.1 bar is 3 L/min/cm$^2$ or more and less than 30 L/min/cm$^2$, it can be accomplished by adjusting the relations between the following 8 factors, i.e., (1) a fibrillation degree of the fibrillated heat-resistant fiber (a weight average fiber length, an aspect ratio, freeness, a specific surface area), (2) a formulation amount of the fibrillated heat-resistant fiber, (3) a size of non-fibrillated fiber, (4) a formulation amount of the non-fibrillated fiber, (5) a fibrillation degree of the fibrillated cellulose (a weight average fiber length, an aspect ratio, freeness, a specific surface area), (6) a formulation amount of the fibrillated cellulose, (7) a basis weight of the wet nonwoven fabric, and (8) a density of the wet nonwoven fabric.

The maximum pore size in the present invention means a maximum pore size measured according to the bubble point test method defined in ASTM F316-86. Measurement of the maximum pore size can be carried out by using a commercially available measurement device (Coulter Porometer, available from COULTER ELECTRONICS LIMITED).

The air permeability in the present invention means an amount of air per unit time and unit surface area passing through a sample when air is supplied to the sample with a pressure of 0.1 bar. Measurement of the air permeability can be carried out by using a commercially available measurement device (Coulter Porometer, available from COULTER ELECTRONICS LIMITED). The present inventors have found that an evaluation of samples which can be difficulty judge the differences by a Fragile test device which is not appropriate for a sample having extremely low air permeability or a Gurley air-permeability meter which is not appropriate for a sample having extremely high air permeability (easily permeable) can be carried out by measuring an air permeability at a pressure of 0.1 bar to accomplish the present invention. Thus, for example, both of physical properties of the maximum pore size and the air permeability at the pressure of 0.1 bar are combined and compared to each other, difference between the samples can be more clearly judged.

For preparing a wet nonwoven fabric, there may be used a cylinder paper machine, a fourdrinier paper machine, a short-wire paper machine, an inclined type paper machine, or a combination paper machine comprising the same or different kinds of the paper machines mentioned above in combination. As water, pure water such as deionized water and distilled water, etc., is preferably used. A dispersant, a thickener or others, which likely causes an effect on the characteristics of electrochemical elements, shall not be added as little as possible, but a suitable amount may be used. In such a case, nonionic one is preferably used.

A basis weight of the separator for an electrochemical element in the present invention is not specifically limited, and preferably 5 g/m$^2$ to 100 g/m$^2$, more preferably 8 g/m$^2$ to 50 g/m$^2$. A thickness of the separator for an electrochemical element of the present invention is not specifically limited, and as a thickness having high uniformity, it is preferably 10 μm to 300 μm, more preferably 20 μm to 150 μm. If it is thinner than 10 μm, sufficient pierce strength can be hardly obtained, while if it is thicker than 300 μm, an electrode surface area contained in the electrochemical element becomes small, so that a capacity of the electrochemical element becomes sometimes small.

To the separator for an electrochemical element of the present invention, fabrication treatment such as calendar treatment, thermal calendar treatment, thermal treatment, etc. may be applied, if necessary.

<Fibrillated Heat-Resistant Fiber 1>

Para series wholly aromatic polyamide (available from Teijin Techno Products Limited, TWARON 1080, trade name, fineness: 1.2 dtex, fiber length: 3 mm, a thermal decomposition temperature: 550° C.) was dispersed in water so as to have an initial concentration of 5% by weight, and by using a double disc refiner, a beating treatment was repeated 15 times to prepare a fibrillated para series wholly aromatic polyamide fiber having a weight average fiber length of 1.65 mm, a BET specific surface area of 13.6 m$^2$/g and a Canadian Standard Freeness of 80 ml. In the following, this is designated to as fibrillated heat-resistant fiber 1 or FB1.

<Fibrillated Heat-Resistant Fiber 2>

The fibrillated heat-resistant fiber 1 was subjected to beating treatment by using a high-pressure homogenizer under the conditions of 500 kg/cm$^2$ repeatedly for 25 times to prepare a fibrillated para series wholly aromatic polyamide fiber having a weight average fiber length of 0.65 mm, a BET specific surface area of 17.8 m$^2$/g and a Canadian Standard Freeness of 0 ml. In the following, this is designated to as fibrillated heat-resistant fiber 2 or FB2.

<Fibrillated Heat-Resistant Fiber 3>

Wholly aromatic polyester fiber (available from Kuraray, Co., Ltd., Vectran NT, trade name, fineness: 1.7 dtex, fiber length: 3 mm, a melting point: 280° C.) was dispersed into water so that an initial concentration became 5% by weight, beating treatment is carried out 15 times repeatedly by using a double disc refiner, and then, it is treated by using a high-pressure homogenizer under the conditions of 500 kg/cm$^2$ for 20 times repeatedly to prepare a fibrillated wholly aromatic polyester fiber having a weight average fiber length of 0.35 mm, a BET specific surface area of 9.2 m$^2$/g and a Canadian Standard Freeness of 150 ml. In the following, this is designated to as fibrillated heat-resistant fiber 3 or FB3.

<Fibrillated Heat-Resistant Fiber 4>

Poly-p-phenylene-2,6-benzobisoxazole (PBO) fiber (available from TOYOBO Co., Ltd., Zylon AS, trade name, fineness: 1.7 dtex, fiber length: 3 mm, a thermal decomposition temperature: 650° C.) was dispersed into water so that an initial concentration became 5% by weight, beating treatment is carried out 20 times repeatedly by using a double disc refiner, and then, it is treated by using a high-pressure homogenizer under the conditions of 500 kg/cm$^2$ for 20 times repeatedly to prepare a fibrillated PBO fiber having a weight average fiber length of 0.58 mm, a BET specific surface area of 11.3 m$^2$/g and a Canadian Standard Freeness of 100 ml. In the following, this is designated to as fibrillated heat-resistant fiber 4 or FB4.

<Fibrillated Cellulose 1>

Linter was dispersed in deionized water so that an initial concentration became 5% by weight, and treated 20 times repeatedly by using a high-pressure homogenizer with a pressure of 500 kg/cm$^2$ to prepare a fibrillated cellulose 1 having a weight average fiber length of 0.33 mm and a Canadian Standard Freeness of 0 ml. In the following, this is designated to as fibrillated cellulose 1 or FBC1.

<Fibrillated Cellulose 2>

A fiber obtained from parenchyma cells of sugarcane was dispersed in deionized water so that an initial concentration became 5% by weight, and treated 5 times repeatedly by using a high-pressure homogenizer with a pressure of 500 kg/cm$^2$ to prepare a fibrillated cellulose having a weight average fiber length 0.23 mm and a Canadian Standard Freeness of 0 ml. In the following, this is designated to as fibrillated cellulose 2 or FBC2.

<Preparation of Slurry>

A slurry was prepared by using a pulper with the starting materials and contents thereof as shown in Table 1. At this time, deionized water was used.

"PET1" in Table 1 means a polyethylene terephthalate fiber having a fineness of 0.1 dtex and a fiber length of 3 mm (available from TEIJIN FIBERS LIMITED, TEIJIN TETORON TEPYRUS TM04PN SD0.1X3, trade name), "PET2" means polyethylene terephthalate fiber having a fineness of 0.3 dtex and a fiber length of 3 mm (available from TEIJIN FIBERS LIMITED, TEIJIN TETORON TEPYRUS TM04PN SD0.3X3, trade name), "PET3" means polyethylene terephthalate fiber having a fineness of 0.6 dtex and a fiber length of 5 mm (available from TEIJIN FIBERS LIMITED, TEIJIN TETORON TA04N SD0.6X5, trade name), "PET4" means polyester core-shell complex fiber having a fineness of 1.1 dtex and a fiber length of 5 mm (available from TEIJIN FIBERS LIMITED, TEIJIN TETORON TJ04CN SD1.1X5, trade name, core portion: polyethylene terephthalate, shell portion: a copolymer of polyethylene terephthalate and polyethylene isophthalate, a melting point at the shell portion of 110° C.), "PET5" means polyethylene terephthalate fiber having a fineness of 1.7 dtex and a fiber length of 5 mm (available from TEIJIN FIBERS LIMITED, TEIJIN TETORON TJ04CN SD1.7×5, trade name, core portion: polyethylene terephthalate, shell portion: a copolymer of polyethylene terephthalate and polyethylene isophthalate, a melting point at the shell portion of 110° C.).

"PET6" means wholly aromatic polyester fiber having a fineness of 1.7 dtex and a fiber length of 5 mm (available from Kuraray, Co., Ltd., Vectran HHA, trade name).

"A1" means acrylic fiber having a fineness 0.1 dtex and a fiber length of 3 mm (available from MITSUBISHI RAYON CO., LTD., Vonnel M.V.P, trade name, an acrylonitrile series copolymer comprising three components of acrylonitrile, methyl acrylate, and methacrylic acid derivative acrylonitrile), "A2" means acrylic fiber having a fineness of 0.4 dtex and a fiber length of 3 mm (available from MITSUBISHI RAYON CO., LTD., Vonnel M.V.P, trade name, an acrylonitrile series copolymer comprising three components of acrylonitrile, methyl acrylate, and methacrylic acid derivative), "PA1" means aromatic polyamide fiber having a fineness of 0.08 dtex and a fiber length of 3 mm (available from Kuraray, Co., Ltd., Genestar, trade name, a melting point 255° C., a softening point 230° C.), "PA2" means para series wholly aromatic polyamide fiber having a fineness of 0.75 dtex and a fiber length of 5 mm (available from Teijin Techno Products Limited, Technora, trade name, copolyparaphenylene-3,4'-oxydiphenyleneterephthalamide), "PA3" means para series wholly aromatic polyamide fiber having a fineness of 1.2 dtex and a fiber length of 5 mm (available from Teijin Techno Products Limited, Twaron 1080, trade name), "N1" means Nylon 6,6 fiber having a fineness of 0.5 dtex and a fiber length of 5 mm (available from Asahi Kasei Fibers Corporation, LEONA, trade name), "N2" means Nylon 6 fiber having a fineness of 0.6 dtex and a fiber length of 5 mm (available from UNITIKA LTD., <601>, trade name).

"PBO1" means PBO fiber having a fineness of 1.7 dtex and a fiber length of 6 mm (available from TOYOBO CO., LTD., ZYLON AS, trade name).

"G1" means a microglass fiber having an average fiber diameter of 0.65 μm (available from Manville Co., 106, trade name).

TABLE 1

| Slurry | Starting material, content (% by weight) |
|---|---|
| 1 | FB1/PET1/FBC1 = 50/30/20 |
| 2 | FB1/PET1/FBC2 = 50/20/30 |
| 3 | FB2/PA1/FBC1 = 30/61/9 |
| 4 | FB2/PA1/FBC2 = 50/40/10 |
| 5 | FB3/PET1/FBC1 = 60/20/20 |
| 6 | FB3/PET1/PET3/FBC2 = 50/25/10/15 |
| 7 | FB4/PET3/FBC1 = 40/35/25 |
| 8 | FB4/PET1/FBC2 = 50/15/35 |
| 9 | FB1/A1/PA2/FBC1 = 40/20/35/5 |
| 10 | FB1/A1/PA2/FBC2 = 30/30/30/10 |
| 11 | FB2/A1/PA3/FBC1 = 40/40/10/10 |
| 12 | FB2/A1/PA3/FBC2 = 20/20/50/10 |
| 13 | FB1/A2/FBC1 = 40/50/10 |
| 14 | FB4/A2/PBO1/FBC1 = 25/30/35/10 |
| 15 | FB4/A2/PBO1/FBC2 = 30/30/30/10 |
| 16 | N1/N2 = 70/30 |
| 17 | FB3/PET1/PET2/PET4/FBC1 = 30/20/12/30/8 |
| 18 | FB1/PET1/PET2/PET4/G1/FBC1 = 25/25/7/30/5/8 |
| 19 | FB2/PET1/PET3/PET5/FBC1 = 25/20/15/25/15 |
| 20 | FB1/A1/PET4/FBC2 = 30/30/30/10 |

In the following, the present invention is explained in more detail by referring to Examples, but they are a part of the present invention and the present invention is not limited by these Examples.

EXAMPLES 1 TO 15

By using slurry 1 to 15 shown in Table 1 and paper making machines shown in Table 2, wet paper making was carried out to prepare separators for electrochemical elements 1 to 15. Here, the reference numerals at the column of the paper making machine mean "1" a cylinder paper machine, "2" a combination paper making machine of a cylinder paper machine and an inclined type paper machine, "3" a combination paper making machine of a cylinder paper machine and a cylinder paper machine, "4" a combination paper making machine of a cylinder paper machine and a short-wire paper machine, and "5" an inclined type paper machine.

COMPARATIVE EXAMPLES 1 TO 5

By using slurry 16 to 20 shown in Table 1 and paper making machines shown in Table 2, wet paper making was carried out to prepare separators for electrochemical elements 16 to 20.

TABLE 2

| Example | Separator for electro-chemical element | Slurry | Paper making machine | Basis weight $g/m^2$ | Dimensional change rate % MD | CD |
|---|---|---|---|---|---|---|
| Example 1 | 1 | 1 | 2 | 20 | −1.1 | −0.7 |
| Example 2 | 2 | 2 | 1 | 14 | −1.0 | −0.6 |
| Example 3 | 3 | 3 | 3 | 30 | −3.0 | −2.8 |

TABLE 2-continued

| Example | Separator for electro-chemical element | Slurry | Paper making machine | Basis weight g/m$^2$ | Dimensional change rate % MD | CD |
|---|---|---|---|---|---|---|
| Example 4 | 4 | 4 | 3 | 30 | −1.5 | −1.4 |
| Example 5 | 5 | 5 | 4 | 15 | −2.5 | −2.3 |
| Example 6 | 6 | 6 | 4 | 20 | −2.8 | −2.5 |
| Example 7 | 7 | 7 | 2 | 18 | −2.3 | −1.8 |
| Example 8 | 8 | 8 | 3 | 15 | −2.2 | −1.7 |
| Example 9 | 9 | 9 | 1 | 17 | −0.1 | 0.0 |
| Example 10 | 10 | 10 | 2 | 14 | −1.4 | −1.0 |
| Example 11 | 11 | 11 | 1 | 12 | −1.2 | −0.9 |
| Example 12 | 12 | 12 | 5 | 12 | +1.0 | +0.5 |
| Example 13 | 13 | 13 | 4 | 13 | −1.5 | −1.2 |
| Example 14 | 14 | 14 | 1 | 15 | −1.8 | −1.7 |
| Example 15 | 15 | 15 | 1 | 22 | −1.8 | −1.7 |
| Comparative example 1 | 16 | 16 | 1 | 12 | −9.0 | −8.8 |
| Comparative example 2 | 17 | 17 | 2 | 23 | −6.8 | −6.3 |
| Comparative example 3 | 18 | 18 | 2 | 30 | −3.3 | −2.9 |
| Comparative example 4 | 19 | 19 | 1 | 18 | −3.9 | −3.4 |
| Comparative example 5 | 20 | 20 | 1 | 14 | −4.1 | −3.7 |

<Preparation of Electric Double Layer Capacitors>

By mixing and kneading 85% by weight of activated carbon having an average grain diameter of 6 μm as a positive electrode and a negative electrode, 7% by weight of carbon black as a conductive material, and 8% by weight of polytetrafluoroethylene as a binder, a sheet state electrode having a thickness of 0.2 mm was prepared. This was adhered onto the both surfaces of an aluminum foil having a thickness of 50 μm by using a conductive adhesive, and calendared to prepare an electrode. This was used as a positive electrode and a negative electrode. Separators for electrochemical elements 1 to 8 and 17 to 19 were each interposed between the positive electrode and the negative electrode to laminate these materials, and wound to a spiral shape by using a winding machine to prepare spiral shaped elements. Each of the spiral shaped elements was contained in a case made of aluminum, a positive electrode lead and a negative electrode lead were welded to a positive electrode terminal and a negative electrode terminal attached to the case, and then, the case was sealed except for an electrolyte injection port. The whole case was subjected to vacuum treatment at 250° C. for 50 hours to remove water components contained in the electrodes and the separator for an electrochemical element. This was cooled to room temperature under vacuum, then an electrolyte was injected into the case, and the injection port was closely sealed to prepare electric double layer capacitors 1 to 8 and 17 to 19. As an electrolyte, that in which $(C_2H_5)_3(CH_3)NBF_4$ was dissolved in propylene carbonate with an amount of 1.5 mol/l was used.

<Preparation of Solid Electrolytic Capacitors>

An aluminum foil having a thickness of 50 μm and an etching pore size of 1 to 5 μm was used as an electrode, a connector for a positive electrode was spot welded on one surface of said electrode, and then, the aluminum foil surface was oxidized to form an aluminum oxide dielectric layer. This was used as a positive electrode. Similarly, a connector for a negative electrode was welded on one surface of the aluminum foil electrode, and this was used as a negative electrode. Separators for electrochemical elements 9 to 17 and 20 with a width of 3.2 mm were each positioned on the dielectric layer of the positive electrode, and combined with the negative electrode and wound to form respective elements. Each of these elements was subjected to heat treatment at 280° C. for 60 minutes, cooled, and then dipped in an aqueous solution for polymerization dissolved therein thiophene, an oxidizing agent, a surfactant with predetermined amounts to carry out chemical polymerization, whereby respective solid electrolytic capacitor elements which were integrated with a solid electrolyte of polythiophene were formed. These elements were dried, and then, contained in a case and respective apertures were sealed to prepare solid electrolytic capacitors 9 to 17 and 20.

With regard to the separators for electrochemical, elements 1 to 20, electric double layer capacitors 1 to 8 and 17 to 19, and solid electrolytic capacitors 9 to 17 and 20, they were measured according the following mentioned test methods, and the results were shown in the following Tables 3 to 5.

<Dimensional Changed Rate>

The separators for electrochemical elements 1 to 20 were each cut to a width of 200 mm and a length of 250 mm. They were placed in an isothermal drier (available from Yamato Scientific Co., Ltd., DHS82), and subjected to heat treatment at 250° C. for 50 hours. The sizes before and after the heat treatment were measured, and the changed rates of MD and CD based on the original size were obtained.

<Density>

Densities of the separators for electrochemical elements 1 to 20 subjected to heat treatment at 250° C. for 50 hours were employed the values (g/cm$^3$) as a density in which the basis weight (g/m$^2$) measured according to JIS P8124 was divided by the thickness (μm) measured according to JIS P8118, and shown in the table.

<Maximum Pore Size>

According to the bubble point test method of ASTM F316-86, a maximum pore size of the separators for electrochemical elements 1 to 20 was each measured. As a measurement device, Coulter Porometer (available from COULTER ELECTRONICS LIMITED) was used.

<Air Permeability>

With regard to the separators for electrochemical elements 1 to 20, an air permeability at a pressure of 0.1 bar per unit time and unit surface area was each measured. As a measurement device, Coulter Porometer (available from COULTER ELECTRONICS LIMITED) was used.

<Longer Diameter>

Separators for electrochemical elements 1 to 20 were each cut to 200 mm square, and placed in an isothermal drier (available from Yamato Scientific Co., Ltd., DHS82) and subjected to heat treatment at 280° C. for 60 hours. After the heat treatment, the sample was fixed to a sample holding frame regulated in JIS L1907, and it is so fixed that a height from the surface of the same to the tip of a burette is 10 mm and one drop of water was dropped thereto from the burette. A longer diameter of a wet region after 60 seconds at the time of reaching the water drop to the sample surface was measured. The same measurement was carried out at 4 points per one sample, and the minimum value was shown in the table. The numerical value 6 in the table shows the size of the water drop, and means that the water drop does not completely permeate after 60 seconds had passed.

<Internal Resistance>

It was carried out by charging respective electric double layer capacitors 1 to 8 and 17 to 19 with a voltage of 2.7V, and calculated from lowering in voltage at the time of immediately after initiation of discharge with 20A constant current discharge.

<Voltage Maintaining Rate>

Electric double layer capacitors 1 to 8 and 17 to 19 were each charged with a constant voltage of 2.7V, then, each of the terminals was opened and allowed to stand for 72 hours, and the voltage thereafter was measured. A ratio to 2.7V was made a voltage maintaining rate (%). Higher voltage maintaining rate is more preferred.

<Failure Ratio>

In the preparation of solid electrolytic capacitors, a ratio of the elements which fall apart after the heat treatment at 280° C. for 60 minutes is made a failure ratio.

<ESR>

An ESR (equivalent series resistance) of the solid electrolytic capacitors 9 to 17 and 20, was measured by using an LCZ meter under the conditions of −40° C. and 1 kHz.

<Leak Current>

A leak current was measured after applying a voltage of 6.3V to the solid electrolytic capacitors 9 to 17 and 20, and an average value per 1000 solid electrolytic capacitors was shown.

TABLE 3

| Separator for electrochemical element | Example | Density g/cm³ | Maximum pore size μm | Air permeability L/min/cm² | Longer diameter mm |
|---|---|---|---|---|---|
| 1 | Example 1 | 0.40 | 1.6 | 1.4 | 6 |
| 2 | Example 2 | 0.50 | 1.0 | 0.8 | 6 |
| 3 | Example 3 | 0.28 | 3.3 | 2.7 | 6 |
| 4 | Example 4 | 0.55 | 0.8 | 0.6 | 6 |
| 5 | Example 5 | 0.45 | 1.5 | 1.2 | 6 |
| 6 | Example 6 | 0.35 | 2.8 | 2.6 | 6 |
| 7 | Example 7 | 0.46 | 1.8 | 1.7 | 6 |
| 8 | Example 8 | 0.55 | 0.6 | 0.4 | 6 |
| 9 | Example 9 | 0.33 | 29.6 | 27.2 | 32 |
| 10 | Example 10 | 0.25 | 17.2 | 16.3 | 38 |
| 11 | Example 11 | 0.55 | 9.7 | 8.5 | 22 |
| 12 | Example 12 | 0.48 | 28.8 | 26.3 | 25 |
| 13 | Example 13 | 0.43 | 22.7 | 20.1 | 35 |
| 14 | Example 14 | 0.25 | 27.4 | 24.4 | 27 |
| 15 | Example 15 | 0.42 | 26.5 | 23.0 | 34 |
| 16 | Comparative example 1 | 0.29 | 37.5 | 33.8 | 26 |
| 17 | Comparative example 2 | 0.30 | 6.6 | 6.0 | 6 |
| 18 | Comparative example 3 | 0.35 | 11.4 | 10.2 | 6 |
| 19 | Comparative example 4 | 0.44 | 3.8 | 3.4 | 6 |
| 20 | Comparative example 5 | 0.25 | 18.6 | 17.0 | 6 |

TABLE 4

| Electrochemical element | Internal resistance ΩF | Voltage maintaining rate % |
|---|---|---|
| Electric double layer capacitor 1 (Example 1) | 3.1 | 95 |
| Electric double layer capacitor 2 (Example 2) | 3.2 | 98 |
| Electric double layer capacitor 3 (Example 3) | 2.8 | 85 |
| Electric double layer capacitor 4 (Example 4) | 3.4 | 99 |
| Electric double layer capacitor 5 (Example 5) | 3.3 | 96 |
| Electric double layer capacitor 6 (Example 6) | 3.1 | 90 |
| Electric double layer capacitor 7 (Example 7) | 3.0 | 96 |
| Electric double layer capacitor 8 (Example 8) | 3.5 | 99 |
| Electric double layer capacitor 17 (Comparative example 2) | 3.0 | 33 |
| Electric double layer capacitor 18 (Comparative example 3) | 3.6 | 6 |
| Electric double layer capacitor 19 (Comparative example 4) | 3.2 | 70 |

TABLE 5

| Electrochemical element | Failure ratio % | ESR mΩ | Leak current μA |
|---|---|---|---|
| Solid electrolytic capacitor 9 (Example 9) | 8 | 30 | 30 |
| Solid electrolytic capacitor 10 (Example 10) | 6 | 35 | 25 |
| Solid electrolytic capacitor 11 (Example 11) | 4 | 38 | 22 |
| Solid electrolytic capacitor 12 (Example 12) | 8 | 30 | 30 |
| Solid electrolytic capacitor 13 (Example 13) | 7 | 33 | 29 |
| Solid electrolytic capacitor 14 (Example 14) | 8 | 31 | 30 |
| Solid electrolytic capacitor 15 (Example 15) | 9 | 31 | 30 |
| Solid electrolytic capacitor 16 (Comparative example 1) | 100 | Impossible to measure | Impossible to measure |
| Solid electrolytic capacitor 17 (Comparative example 2) | 92 | 45 | 53 |
| Solid electrolytic capacitor 20 (Comparative example 5) | 81 | 41 | 46 |

As shown in Table 2, in the separators for electrochemical elements prepared in Examples 1 to 15, dimensional change rates of MD and CD after the heat treatment at 250° C. for 50 hours are within the range of −3% to +1% and they are excellent in heat-resistance, so that the electrochemical elements prepared by providing said separators are, as shown in Table 4 and Table 5, extremely low in the failure ratio, low in the internal resistance, and show extremely high voltage maintaining rate or extremely little leak current, whereby they have realized high reliability.

The separators for electrochemical elements prepared in Examples 1 to 8 have, as shown in Table 3, a density after the heat treatment at 250° C. for 50 hours of 0.25 g/cm³ or more and 0.55 g/cm³ or less, the maximum pore size of 3.5 μm or less, and the air permeability at a pressure of 0.1 bar of 0.5 L/min/cm$^2$ or more and less than 3 L/min/cm$^2$, so that they are particularly suitable as a separator for an electric double layer capacitor.

The separators for electrochemical elements prepared in Examples 9 to 15 have, as shown in Table 3, a longer diameter of a wet region formed by permeating water drop to a plane direction dropped by the dropping method according to JIS L1907 after 60 second, which had been subjected to heat treatment at 280° C. for 60 minutes, of 20 mm or longer, so that permeability of a monomer aqueous solution for a conductive polymer is extremely good, and they are suitable particularly as a separator for a solid electrolytic capacitor using a conductive polymer as a dielectric material.

On the other hand, in the separators for electrochemical elements prepared in Comparative example 1 to 5, as shown in Table 3, dimensional change rates of MD and CD after the heat treatment at 250° C. for 50 hours are extremely large and heat resistance is insufficient, so that, as shown in Tables 4 and 5, there are cases where the failure ratio of the electrochemical element is extremely high or the voltage maintaining rate is low, whereby their reliabilities are poor.

UTILIZABILITY IN INDUSTRY

The separator for an electrochemical element of the present invention contains fibrillated heat-resistant fiber, fibrillated cellulose and non-fibrillated fiber, and has a suitable range after heat treatment, so that it can realize an electrochemical element excellent in heat-resistance and low resistance, or an electrochemical element with high reliability.

As an example of the separator for an electrochemical element of the present invention, there may be mentioned a use in which heat resistance and low internal resistance are required, for example, a separator such as an electric double layer capacitor, a solid electrolytic capacitor, a lithium ion battery, etc.

The invention claimed is:

1. A separator for a solid electrolytic capacitor, which comprises wet nonwoven fabric containing fibrillated cellulose, non-fibrillated fiber, and fibrillated heat-resistant fiber having all of a softening point, a melting point, and a thermal decomposition temperature of which being 250° C. or higher and 700° C. or lower, wherein said fibrillated heat-resistant fiber is at least one member selected from the group consisting of wholly aromatic polyamide, wholly aromatic polyester, wholly aromatic polyester amide, wholly aromatic polyether, wholly aromatic polycarbonate, wholly aromatic polyazomethine, polyphenylene sulfide, poly-p-phenylenebenzobisthiazole, polybenzimidazole, polyetherether ketone, polyamideimide, polyimide, polytetrafluoroethylene and poly-p-phenylene-2,6-benzobisoxazole, the wet nonwoven fabric being formulated in amounts of 25% by weight to 60% by weight of the fibrillated heat-resistant fiber, 10% by weight to 20% by weight of the fibrillated cellulose, and 20% by weight to 65% by weight of the non-fibrillated fiber, provided that (1) when a formulation amount of the fibrillated heat-resistant fiber is 40% by weight or more, then a formulation amount of a non-fibrillated fiber, having a component a melting point of which is lower than 200° C., is 0% by weight to 30% by weight, and that (2) when a formulation amount of the fibrillated heat-resistant fiber is 15% by weight or more and less than 40% by weight, then a formulation amount of the non-fibrillated fiber, having a component a melting point of which is lower than 200° C., is 0% by weight to 20% by weight, and a formulation amount of a non-fibrillated fiber having a component all of a softening point, a melting point, and a thermal decomposition temperature of which is 250° C. or higher and 700° C. or lower is 10% by weight or more, wherein the wet nonwoven fabric has dimensional change rates of MD (machine direction) and CD (a direction which is right angle to the MD) when the wet nonwoven fabric is subjected to heat treatment at 250° C. for 50 hours of each −3% to +1%, and wherein the wet nonwoven fabric has properties that, after the wet nonwoven fabric is subjected to heat treatment at 280° C. for 60 minutes, a longer diameter of a wet region formed by a water drop dropped onto the fabric by a dropping method according to JIS L1907 and permeated to a plane surface direction after 60 second is 20 mm or longer.

2. The separator according to claim 1, wherein the fibrillated heat-resistant fiber is wholly aromatic polyamide fiber.

3. The separator according to claim 1, wherein the wholly aromatic polyamide is at least one para series wholly aromatic polyamide selected from the group consisting of poly (paraphenylenetelephthalamide), poly(parabenzamide), poly (paraamide hydrazide), poly(paraphenylenetelephthalamide-3,4-diphenyl ether telephthalamide), poly(4,4'-benzanilide telephthalamide), poly(paraphenylene-4,4'-biphenylenedicarboxylic acid amide), poly(paraphenylene-2,6-naphthalene dicarboxylic acid amide), poly(2-chloro-p-phenylenetelephthalamide) and copolyparaphenylene-3,4'-oxydiphenylenetelephthalamide.

4. The separator according to claim 1, wherein the fibrillated heat-resistant fiber is wholly aromatic polyester fiber.

5. The separator according to claim 4, wherein the wholly aromatic polyester is obtained by polymerizing at least two kinds of monomers selected from the group consisting of an aromatic diol, an aromatic dicarboxylic acid and an aromatic hydroxycarboxylic acid.

6. The separator according to claim 1, wherein the fibrillated cellulose is cellulose obtained from parenchyma cells of a plant.

* * * * *